United States Patent [19]

Fawcett et al.

[11] Patent Number: 4,489,559

[45] Date of Patent: Dec. 25, 1984

[54] TURBOCHARGER FOR INTERNAL COMBUSTION ENGINES

[75] Inventors: Sherwood L. Fawcett, Columbus; James N. Anno, Cincinnati, both of Ohio

[73] Assignee: Battelle Development Corporation, Columbus, Ohio

[21] Appl. No.: 401,264

[22] Filed: Jul. 23, 1982

Related U.S. Application Data

[63] Continuation-in-part of Ser. No. 123,543, Feb. 22, 1980.

[51] Int. Cl.³ .................................................. F02B 37/00
[52] U.S. Cl. ................................................................ 60/605
[58] Field of Search ........................ 60/605; 418/33, 35

[56] References Cited

U.S. PATENT DOCUMENTS 3,859,789  1/1975  Fawcett et al. .................. 418/33 X

*Primary Examiner*—Michael Koczo
*Attorney, Agent, or Firm*—Thomas H. Murray; Clifford A. Poff

[57] ABSTRACT

A turbocharger for internal combustion engines comprising a unidirectional energy converter having a closed, continuous loop passageway containing a plurality of freely-movable, unrestrained bodies which travel around the passageway in one direction only. In one region of the passageway, successive bodies are propelled in one direction around the passageway by exhaust gases from an internal combustion engine. In another region of the passageway, the kinetic energy of the propelled bodies is used to compress a gas, which can be mixed with fuel. This compressed gas is then forced into the cylinders of the internal combustion engine; whereupon the bodies are again propelled around the passageway to repeat the cycle. The exhaust gases and air or an air/fuel mixture are exhausted and introduced in an expansion space in the converter through substantially immediately adjacent ports.

12 Claims, 4 Drawing Figures

TURBOCHARGER FOR INTERNAL COMBUSTION ENGINES

CROSS-REFERENCE TO RELATED APPLICATION

This application is a continuation-in-part of application Ser. No. 123,543, filed Feb. 22, 1980.

BACKGROUND OF THE INVENTION

As is known, the purpose of supercharging or turbocharging an internal combustion engine is to increase its horsepower output without increasing its speed. This is accomplished by increasing the mass flow rate over a naturally aspirated engine by pressurizing the intake gas. Supercharging uses crankshaft power to drive a compressor to accomplish this task; whereas tubocharging uses the energy of the exhaust gases, via a turbine, to drive a compressor to accomplish the same result. Since a supercharger is parasitic to engine performance (a gear-driven supercharger can use more than 20% of the total engine power at sea level), the turbocharger is considered superior for commercial road vehicles.

In the operation of a typical turbocharger, exhaust gases from the engine drive a turbine which, in turn, drives a compressor. Fresh air is taken from the outdoors, cleaned and mixed with the gasoline in the carburetor. The gasoline/air mixture is then compressed in the compressor and fed to the cylinders for combustion. In fuel-injection systems (e.g., diesel engines), on the other hand, the fuel is injected into the compressed air. For typical small passenger cars, the boost pressure is only about 9 pounds per square inch, but this is sufficient to double the peak horsepower.

Turbochargers currently in use suffer at least four major problems. First, when accelerating from a condition where the engine is idling with the vehicle at rest, the response is sluggish. This sluggish response has been termed "turbolag". What is needed is instantaneous response to full boost. Secondly, current turbochargers operate at some boost at all throttle conditions. What is needed is no boost at partial throttle conditions, and instantaneous boost at wide-open throttle, constant for all engine speeds. Thirdly, current turbochargers are lubricated with the engine oil. Dirt in the oil causes lubrication problems at the high-speed operation of the turbocharger (e.g., 100,000 RPM). Finally, current turbochargers are expensive. Conversion kits for non-turbocharged vehicles presently cost in excess of $1000.00.

SUMMARY OF THE INVENTION

In accordance with the present invention, a new and improved turbocharger is provided which overcomes many of the aforesaid disadvantages of prior art turbochargers. The turbocharger of the invention is low-cost, provides for instantaneous response, and is not subject to dirt in the engine oil. Actually, the invention is not truly a turbocharger in that it does not employ a turbine; but it is somewhat similar to a turbocharger in that it operates on exhaust gases. The invention employs, as a basic component, a unidirectional energy converter such as that shown and described in U.S. Pat. No. 3,859,789, issued Jan. 14, 1975. High-temperature pressurized exhaust gas from an internal combustion engine is fed into the unidirectional energy converter where the gas energy is initially converted to kinetic energy of pistons. Once expanded, the exhaust gas is discharged from the converter and a fresh air/fuel mixture is taken into the compressor region, compressed to the desired boost pressure by the energy of the pistons, and discharged to the cylinders of the engine.

In a specific embodiment of the invention, there is provided a continous, closed-loop passageway containing a plurality of freely-movable bodies. Means are provided in one region of the passageway for propelling the bodies in one direction around the passageway with the use of exhaust gases from an internal combustion engine. In another region of the passageway beyond the first region, means are provided for converting at least a portion of the kinetic energy of the propelled bodies into energy in the form of a compressed gas. This compressed gas is then conducted to the cylinders of the internal combustion engine with or without the addition of fuel where it is further compressed by movement of the pistons within the cylinders.

The new subject matter of this continuation-in-part application provides that an oxygen-containing gas is aspirated into the aforementioned continuous, closed-loop passageway substantially immediately after expanded exhaust gas is exhausted from the passageway. Ducts are preferably arranged to extend generally tangent and in opposite general directions from intake and exhaust ports in the passageway. The expanded exhaust gas is passed through an exhaust port situated in the outer circumference of the passageway. The oxygen-containing gas is aspirated through a port in the inner circumference of the passageway.

The above and other objects and features of the invention will become apparent from the following detailed description taken in connection with the accompanying drawings which form a part of this specification, and in which.

Figure 1:
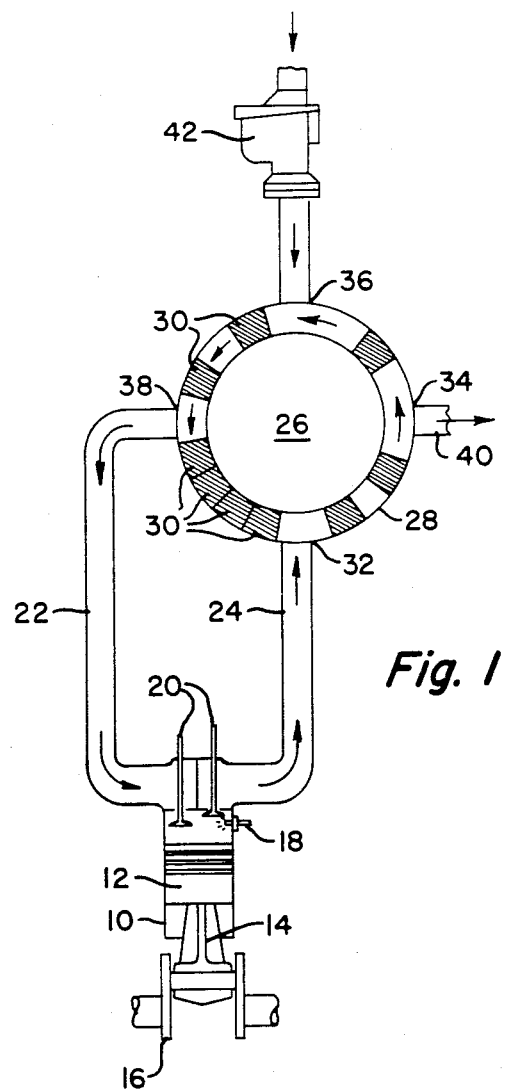
FIG. 1 is a schematic illustration of one embodiment of the invention.

With reference now to the drawings, and particularly to FIG. 1, a cylinder 10 of an internal combustion engine is shown having a piston 12 reciprocable therein and connected through piston rod 14 to a crankshaft 16. It will be assumed, for purposes of illustration, that the engine is a gasoline engine which operates on the Otto cycle and is provided with a sparkplug 18. Conventional valves 20 interconnect the top of the cylinder 10 with an intake manifold 22 and an exhaust manifold 24, as is conventional.

Figure 2:
FIG. 2 is a perspective view of the freely-movable bodies utilized in the unidirectional energy converter of FIG. 1.

Both the intake and exhaust manifolds 22 and 24 are connected to a unidirectional energy converter, generally indicated by the reference numeral 26. The energy converter comprises a continuous, closed-loop passageway 28 (schematically shown in cross section) having a plurality of freely-movable bodies or pistons 30 therein. The pistons 30 may, for example, appear as in FIG. 2 and comprise cylindrical metal plugs which have a radius of curvature corresponding to the radius of curvature of the closed-loop passageway 28. Alternatively, the pistons 30 may comprise spheres or other geometries conforming to the passageway. The tolerance or clearance between the surfaces of the pistons 30 and the inside walls of the closed-loop passageway 28 is such as to permit the pistons to move freely through the passageway. However, fluid flow past the pistons within the passageway is substantially prevented. Additionally, the pistons may be equipped with conventional piston rings. The continuous, closed-loop passageway 28 is provided with four ports 32, 34, 36 and 38 spaced around the passageway 28 at intervals of about 90°. Port 32 is connected to the exhaust manifold 24 as shown; whereas port 38 is connected to the intake manifold 22. Port 34 is connected to an exhaust pipe 40 which discharges into the atmosphere; while port 36 is connected to the outlet side of a conventional carburetor 42.

The continuous, closed-loop passageway 28 is divided into regions or zones, the region between ports 32 and 34 comprising an expander section wherein exhaust gases entering port 32 cause successive ones of the pistons 30 to be propelled around the passageway 28 in a counterclockwise direction as viewed in FIG. 1. That is, the hot exhaust gases from the engine enter the passageway 28 and expand adiabatically, imparting kinetic energy in the form of increased forward velocity to each piston 30 while the gas between successive ones of the pistons is reduced in temperature. As the pistons pass port 34, the cooler exhaust gases which have been adiabatically expanded exit to the atmosphere; while the pistons 30 continue on to the port 36 where they draw in a mixture of fuel and air from the carburetor 42. Between ports 36 and 38, the air/fuel mixture is compressed, the compressed gas exiting through port 38 to the intake manifold 22. Between ports 38 and 32, the pistons 30 in a thruster region move downwardly under gravity and in abutment to the point where they are again propelled in a counterclockwise direction by the exhaust gases to repeat the cycle. In the thruster region, the force of gravity acting on the pistons balances the forces around the passageway. Other means, such as a ratchet-type latch, can be used in the thruster region to prevent backward movement of the pistons under the influence of the entering exhaust gases.

Figure 3:
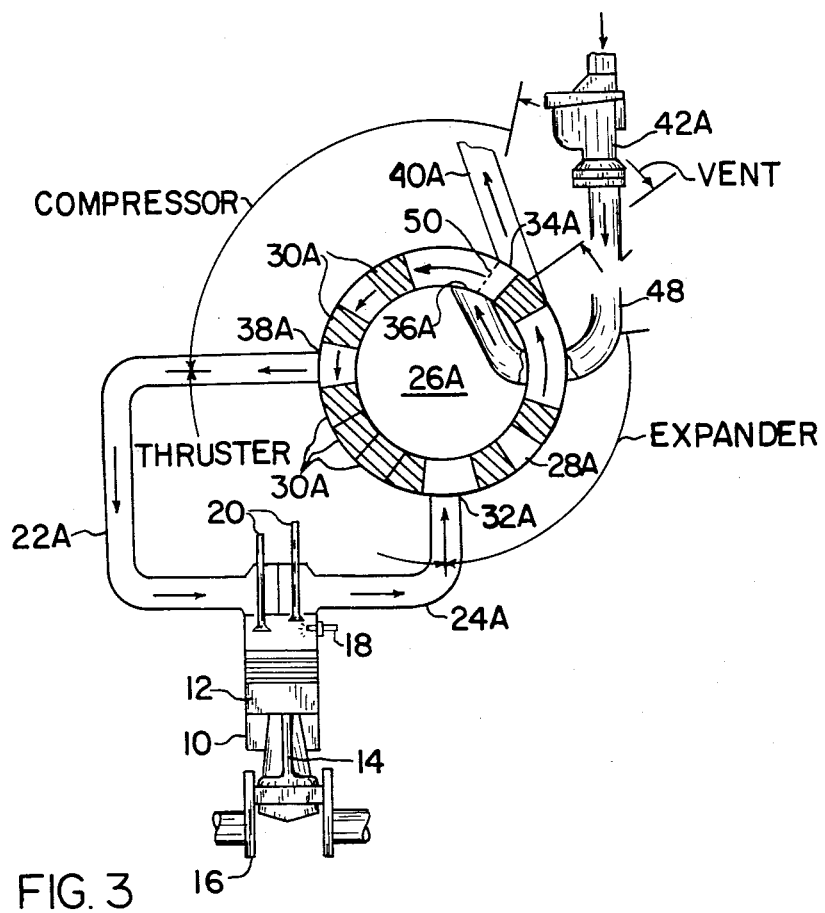
FIG. 3 is a schematic illustration similar to FIG. 1 illustrating an embodiment according to this continuation-in-part application.
Figure 4:
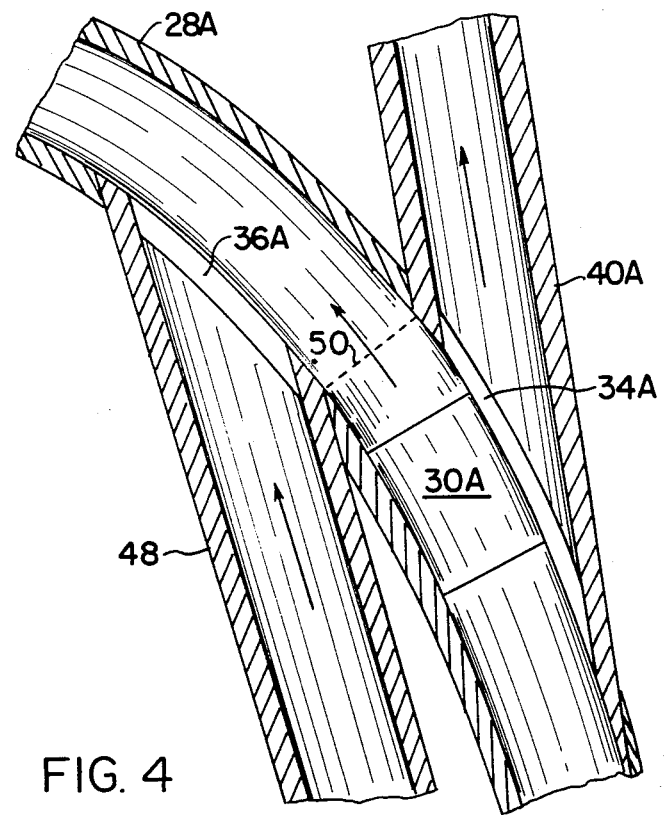
FIG. 4 is an enlarged sectional view of a segment of a continuous, closed-loop passageway with intake and exhaust ports communicating therewith.

In FIGS. 3 and 4, the same reference numerals have been applied to parts which are identical to the parts described in regard to FIG. 1 and the suffix "A" has been applied to reference numerals identifying parts which correspond to the parts which are described in regard to FIG. 1. The intake and exhaust manifolds 22A and 24A, respectively, are connected as before to a unidirectional energy converter 26A. The continuous, closed-loop circular passageway 28A has a radius of curvature corresponding to a radius of curvature of pistons 30A which are cylindrical curved elements or may comprise spheres or other geometries conforming to the passageway to permit the pistons to move freely through the passageway. Fluid flow past the pistons within the passageway is substantially prevented and the pistons may be equipped with conventional piston rings. The passageway 28A is provided with four ports 32A, 34A, 36A and 38A which are spaced around the passageway and form regions or zones. An expander section is formed by the region between ports 32A and 34A which, for example, extends about 120° around the passageway wherein exhaust gases entering port 32A cause successive ones of the pistons 30A to be propelled around the passageway in a counterclockwise direction as viewed in FIG. 3. The hot exhaust gases expand adiabatically, imparting kinetic energy in the form of increased forward velocity to each piston 30A through- out the region of the expander section; while the gas between successive ones of the pistons is reduced in temperature. As the pistons pass port 34A, the cooler exhaust gases pass from the port which is situated at the outer circumferential wall of the passageway into an exhaust pipe 40A for exhausting into the atmosphere. The exhaust pipe extends in a generally tangential direction to receive the exhaust gases with a minimum of obstruction after expanding in a unit cell between pistons and moving with a forward velocity. Immediately, or at least substantially immediately thereafter, oxygen-containing gas is aspirated into the passageway through port 36A from an intake header pipe 48. The flow of oxygen-containing gas in pipe 48 is admixed with fuel from carburetor 42A. The region between exhaust port 34A and intake port 36A is denoted in FIG. 3 as a vent. Demarcation line 50 denotes the termination of exhaust port 34A which is immediately adjacent the starting point of intake port 36A. A relatively small arcuate spacing may be provided between ports 34A and 36A, if desired. Intake port 36A is situated in the wall at the inner circumference of the pasageway so that aspiration occurs due to the Bernoulli effect.

The dynamics of fluid flow are enhanced at port 36A by the lower pressure of a pressure differential that exists between the inside circumferential wall and the outside circumferential wall of the closed-loop passageway in this area. In this regard, the mass of the pistons and any gas which exists in a unit cell between pistons is subject to the inertial effect of movement about the closed-loop passageway. It will also be observed in regard to FIGS. 3 and 4 that the flow of exhaust gases in pipe 40A and oxygen-containing gas in pipe 48 is in a generally parallel relation, although this is not essential. The flow of gases in pipes 40A and 48 at areas adjacent the respective ports is in opposite directions with respect to the closed-loop passageway.

Between ports 36A and 38A, the fuel, oxygen-containing air mixture is compressed. Thus, the region between these ports is denoted in FIG. 3 as a compressor. The compressed mixture exits through port 38A to the intake manifold 22A. Between ports 38A and 32A a region denoted in FIG. 3 as a thruster, is formed wherein the pistons 30A abut and move downwardly under gravity to a point where they are again propelled in a counterclockwise direction by exhaust gases to repeat the cycle. As described hereinbefore a ratchet-type latch or other means can be used in the thruster to prevent backward movement of the pistons under the influence of entering exhaust gases through passageway 32A.

Thus, exhaust gases entering port 32 and 32A propel the pistons 30 and 30A, respectively, around the closed-loop passageway 28 or 28A while the compressed mixture of fuel and air entering port 36 or 36A is compressed and exits through port 38 or 38A to the manifold 22 or 22A where it is forced into the cylinder 10 on the down stroke of the piston 12 in a conventional Otto cycle. It is, of course, also possible to utilize the turbocharger of the invention with a diesel engine, in which case fuel is injected into the air entering port 36 or 36A or fuel is injected directly into the cylinder 10 as is conventional. At high engine speeds and powers, the exhaust gas energy may be excessive to run the turbocharger. In this case, part of the waste gas must be bypassed by the use of a conventional "wastegate".

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Turbocharger apparatus for an internal combustion engine comprising a continuous, closed-loop passageway, a plurality of freely-movable bodies disposed within said passageway, means to introduce exhaust gases from said internal combustion engine into one region of the passageway for propelling said bodies in one direction around the passageway, means for exhausting exhaust gases from said passageway, means substantially immediately adjacent said means for exhausting for introducing an oxygen-containing gas into said passageway, means in another region of the passageway for converting at least a portion of the kinetic energy of the propelled bodies into energy in the form of a compressed gas, and means for conducting said compressed gas to the cylinders of said internal combustion engine where it is further compressed by movement of pistons within the cylinders.

2. The turbocharger apparatus of claim 1 wherein said compressed gas comprises a mixture of air and fuel derived from a carburetor.

3. The turbocharger apparatus of claim 1 wherein said internal combustion engine is a diesel engine and said compressed gas comprises air.

4. The turbocharger apparatus of claim 1 wherein said passageway has four ports spaced around its periphery, one of said ports being connected to a source of exhaust gases under pressure from said internal combustion engine, a second of said ports defining at least part of said means for exhausting and acting to exhaust said exhaust gases from the passageway after said bodies have been propelled, a third of said ports defining at least part of said means for introducing and acting to draw gas to be compressed into said passageway, and a fourth of said ports acting to convey compressed gas to the cylinders of said internal combustion engine.

5. The turbocharger apparatus of claim 1 wherein said means in one region is arranged in said passageway to propel said bodies by adiabatic expansion of said exhaust gases.

6. The turbocharger apparatus of claim 1 wherein said means for exhausting exhaust gases includes an exhaust duct communicating with a port in the outer circumference of said passageway.

7. The turbocharger apparatus according to claim 1 or 6 wherein said means for introducing includes a duct communicating with a port in the inner circumference of said passageway.

8. Turbocharger apparatus for an internal combustion engine comprising a continuous, closed-loop passageway, a plurality of freely-movable bodies disposed within said passageway, first port means for introducing exhaust gases from said internal combustion engine into said passageway to thereby propel successive ones of the bodies in one direction around the passageway, second port means in the passageway spaced from the first port means in the direction of movement of said bodies for exhausting said exhaust gases from the passageway, third port means substantially immediately adjacent the second port means forwardly thereof in the direction of movement of the bodies for introducing air into the passageway, and fourth port means intermediate the first and third port means connecting said passageway to the cylinders of said internal combustion engine.

9. The turbocharger apparatus of claim 8 wherein said third port means is connected to a device for mixing air with fuel.

10. The turbocharger apparatus of claim 8 wherein said bodies are in abutment in the region of said passageway between said fourth and first port means but are separated by gas pockets as they travel around the remainder of the passageway.

11. The turbocharger apparatus of claim 8 wherein said second port means is in the outer circumference of said passageway.

12. The turbocharger apparatus of claim 8 or 11 wherein said third port means is in the inner circumference of said passageway.

* * * * *